(12) United States Patent
Cavallaro et al.

(10) Patent No.: US 6,960,630 B2
(45) Date of Patent: Nov. 1, 2005

(54) THIN, THERMOSET, POLYURETHANE-COVERED GOLF BALL WITH A DUAL CORE

(75) Inventors: Christopher Cavallaro, Lakeville, MA (US); Ryan W Bosanko, Mattapoisett, MA (US); Peter R Voorheis, Fall River, MA (US)

(73) Assignee: Acushnet Company, Fairhaven, MA (US)

( * ) Notice: Subject to any disclaimer, the term of this patent is extended or adjusted under 35 U.S.C. 154(b) by 216 days.

(21) Appl. No.: 10/346,763

(22) Filed: Jan. 17, 2003

(65) Prior Publication Data

US 2003/0134955 A1 Jul. 17, 2003

Related U.S. Application Data

(60) Division of application No. 10/051,715, filed on Jan. 17, 2002, now Pat. No. 6,849,006, which is a continuation-in-part of application No. 09/951,963, filed on Sep. 13, 2001, now Pat. No. 6,635,716, and a continuation-in-part of application No. 09/782,782, filed on Feb. 13, 2001, which is a continuation-in-part of application No. 09/274,015, filed on Mar. 22, 1999, now abandoned, which is a continuation-in-part of application No. 08/863,788, filed on May 27, 1997, now Pat. No. 5,885,172, said application No. 10/051,715, is a continuation-in-part of application No. 09/721,740, filed on Nov. 27, 2000, now Pat. No. 6,486,261, which is a continuation-in-part of application No. 09/461,736, filed on Dec. 16, 1999, now Pat. No. 6,465,578, and a continuation-in-part of application No. 09/311,591, filed on May 14, 1999, now Pat. No. 6,210,294.

(51) Int. Cl.$^7$ .............................................. A63B 37/12
(52) U.S. Cl. ...................... 525/261; 473/373; 473/374; 473/376
(58) Field of Search ..................... 525/261; 473/373, 473/374, 376

(56) References Cited

U.S. PATENT DOCUMENTS

| | | | |
|---|---|---|---|
| 3,147,324 A | 9/1964 | Ward ........................... 264/254 |
| 3,177,280 A | 4/1965 | Ford et al. ................... 264/254 |
| 3,239,228 A | 3/1966 | Crompton .................... 273/218 |
| 3,262,272 A | 7/1966 | Barakauskas et al. ....... 60/39.05 |
| 3,572,721 A | 3/1971 | Harrison et al. ............. 372/218 |
| 3,572,722 A | 3/1971 | Harrison et al. ............. 273/218 |
| 3,616,101 A | 10/1971 | Satchell et al. ................. 161/7 |
| 3,666,272 A | 5/1972 | Walker et al. ................ 273/218 |
| 3,804,421 A | 4/1974 | Alex et al. ................... 273/218 |
| 3,808,077 A | 4/1974 | Rieser et al. ................ 156/102 |
| 3,926,933 A | 12/1975 | Naylor ....................... 260/94.3 |
| 3,965,055 A | 6/1976 | Shichman et al. .............. 260/3 |
| 3,989,568 A | 11/1976 | Isaac ........................... 156/182 |
| 3,992,014 A | 11/1976 | Retford ....................... 273/218 |
| 4,033,900 A | 7/1977 | Hargis et al. ............. 252/431 L |
| 4,062,825 A | 12/1977 | Watabe et al. ............. 260/37 N |
| 4,123,061 A | 10/1978 | Dusbiber .................... 273/220 |
| 4,144,223 A | 3/1979 | Kent ......................... 260/42.47 |
| 4,203,941 A | 5/1980 | Brooker ...................... 264/250 |
| 4,310,582 A | 1/1982 | Stumpe, Jr. .................. 428/182 |
| 4,431,193 A | 2/1984 | Nesbitt ........................ 273/235 |
| 4,499,239 A | 2/1985 | Murakami et al. ........... 525/111 |
| 4,625,964 A | 12/1986 | Yamada ........................ 273/62 |
| 4,650,193 A | 3/1987 | Molitor et al. ............... 273/228 |
| 4,692,497 A | 9/1987 | Gendreau et al. ............ 525/263 |
| 4,848,770 A | 7/1989 | Shama ........................ 273/228 |
| 4,858,924 A | 8/1989 | Saito et al. .................... 273/62 |
| 4,914,152 A | 4/1990 | Miyashita et al. ............. 525/68 |
| 4,929,434 A | 5/1990 | Lobley |
| 4,931,376 A | 6/1990 | Ikematsu et al. ............ 526/164 |
| 4,959,000 A | 9/1990 | Giza ........................... 425/116 |
| 4,968,752 A | 11/1990 | Kawamoto et al. .......... 525/194 |
| 4,971,329 A | 11/1990 | Llort et al. .................. 273/218 |
| 4,984,803 A | 1/1991 | Llort et al. .............. 273/235 R |
| 5,002,281 A | 3/1991 | Nakahara et al. ............ 273/220 |
| 5,006,288 A | 4/1991 | Rhodes et al. .............. 264/46.4 |
| 5,006,297 A | 4/1991 | Brown et al. ................ 264/234 |
| 5,017,636 A | 5/1991 | Hattori et al. ............... 524/300 |
| 5,025,059 A | 6/1991 | Mouri et al. ................ 524/495 |
| 5,037,104 A | 8/1991 | Watanabe et al. .......... 273/35 R |
| 5,072,944 A | 12/1991 | Nakahara et al. ............ 273/220 |
| 5,112,556 A | 5/1992 | Miller ......................... 264/279 |

(Continued)

FOREIGN PATENT DOCUMENTS

| | | |
|---|---|---|
| AU | A-16547/97 | 2/1997 |
| AU | A-16548/97 | 2/1997 |
| EP | 0 577 058 A1 | 1/1994 |
| EP | 0 903 357 A1 | 3/1999 |
| GB | 1 168 609 | 10/1969 |
| GB | 1 209 032 | 10/1970 |
| GB | 2278609 | 7/1994 |
| GB | 2291811 | 7/1996 |
| GB | 2291812 | 7/1996 |
| GB | 2 321 021 | 7/1998 |
| WO | WO 98/37929 | 9/1998 |

OTHER PUBLICATIONS

Raj B. Durairaj et al., "Cast Polyurethanes From Resorcinol–Based Aromatic Diols" (Oct. 10–14, 1998).

Raj B. Durairaj, "HER Materials For Polyurethane Applications" (Spring, 1999).

*Primary Examiner*—David J. Buttner
(74) *Attorney, Agent, or Firm*—William B. Lacy (57) ABSTRACT

A golf ball comprising a core including a center having an outer diameter from about 0.375 inches to about 1.4 inches and deflection of greater than about 4.5 mm under a load of 100 Kg and an outer core layer having an outer diameter of from about 1.4 in to about 1.62 in, wherein at least one of the center or core layer includes polybutadiene rubber composition including a halogenated organosulfur compound or a metal salt thereof, and a cover including an inner cover layer having an outer diameter of greater than about 1.58 in and a material hardness of less than about 72 Shore D and an outer cover layer having a hardness of greater than about 50 Shore D and a material hardness of less than about 50 Shore D.

20 Claims, 1 Drawing Sheet

U.S. PATENT DOCUMENTS

| | | | | |
|---|---|---|---|---|
| 5,131,662 | A | 7/1992 | Pollitt | 273/230 |
| 5,141,233 | A | 8/1992 | Yuki et al. | 273/218 |
| 5,150,905 | A | 9/1992 | Yuki et al. | 273/218 |
| 5,184,828 | A | 2/1993 | Kim et al. | 273/228 |
| 5,252,652 | A | 10/1993 | Egashira et al. | 524/392 |
| 5,253,871 | A | 10/1993 | Viollaz | 273/228 |
| 5,314,187 | A | 5/1994 | Proudfit | 273/235 R |
| 5,334,673 | A | 8/1994 | Wu | 273/235 R |
| 5,415,937 | A | 5/1995 | Cadomica et al. | 428/407 |
| 5,421,580 | A | 6/1995 | Sugimoto et al. | 273/227 |
| 5,461,109 | A | 10/1995 | Blair et al. | 524/839 |
| 5,484,870 | A | 1/1996 | Wu | 528/28 |
| 5,494,958 | A | 2/1996 | Freeman et al. | 524/505 |
| 5,496,496 | A | 3/1996 | Kajita et al. | 252/182.24 |
| 5,543,467 | A | 8/1996 | Hamada et al. | 525/207 |
| 5,553,852 | A | 9/1996 | Higuchi et al. | 473/378 |
| 5,565,524 | A | 10/1996 | Hamada et al. | 525/208 |
| 5,574,107 | A | 11/1996 | Hiraoka et al. | 473/378 |
| 5,575,472 | A | 11/1996 | Magerman et al. | 29/530 |
| 5,585,440 | A | 12/1996 | Yamada et al. | 525/193 |
| 5,586,950 | A | 12/1996 | Endo | 473/378 |
| 5,587,420 | A | 12/1996 | Takizawa et al. | 524/572 |
| 5,589,546 | A | 12/1996 | Hiraoka et al. | 525/193 |
| 5,605,968 | A | 2/1997 | Egashira et al. | 525/221 |
| 5,609,535 | A | 3/1997 | Morgan | 473/409 |
| 5,625,003 | A | 4/1997 | Kato et al. | 525/208 |
| 5,663,235 | A | 9/1997 | Tanaka | 525/201 |
| 5,668,191 | A | 9/1997 | Kinkelaar et al. | 473/373 |
| 5,692,974 | A | 12/1997 | Wu et al. | 473/377 |
| 5,697,856 | A | 12/1997 | Moriyama et al. | 473/374 |
| 5,704,852 | A | 1/1998 | Kato | 473/357 |
| 5,711,723 | A | 1/1998 | Hiraoka et al. | 473/374 |
| 5,716,293 | A | 2/1998 | Yabuki et al. | 473/363 |
| 5,728,011 | A | 3/1998 | Sugimoto et al. | 473/357 |
| 5,733,428 | A | 3/1998 | Calabria et al. | 264/134 |
| 5,744,549 | A | 4/1998 | Lutz | 525/129 |
| 5,759,676 | A | 6/1998 | Cavallaro | 428/215 |
| 5,776,012 | A | 7/1998 | Moriyama et al. | 473/372 |
| 5,776,013 | A | 7/1998 | Yokota | 473/377 |
| 5,779,561 | A | 7/1998 | Sullivan et al. | 473/373 |
| 5,779,562 | A | 7/1998 | Melvin | 473/373 |
| 5,803,831 | A | 9/1998 | Sullivan et al. | 473/372 |
| 5,810,678 | A | 9/1998 | Cavallaro | 473/373 |
| 5,813,923 | A | 9/1998 | Cavallaro | 473/373 |
| 5,816,944 | A | 10/1998 | Asakura et al. | 473/372 |
| 5,827,134 | A | 10/1998 | Sullivan et al. | 473/372 |
| 5,833,553 | A | 11/1998 | Sullivan et al. | 473/374 |
| 5,840,801 | A | 11/1998 | Gardiner | 525/54.44 |
| 5,856,388 | A | 1/1999 | Harris et al. | 524/320 |
| 5,859,153 | A | 1/1999 | Kirk et al. | 525/481 |
| 5,861,465 | A | 1/1999 | Hamada et al. | 525/332.6 |
| 5,872,185 | A | 2/1999 | Ichikawa et al. | 525/93 |
| 5,877,264 | A | 3/1999 | Logothetis et al. | 526/86 |
| 5,885,172 | A | 3/1999 | Hebert et al. | 473/354 |
| 5,885,173 | A | 3/1999 | Keller | 473/385 |
| 5,888,437 | A | 3/1999 | Calabria et al. | 264/135 |
| 5,899,822 | A | 5/1999 | Yamagishi et al. | 473/374 |
| 5,902,855 | A | 5/1999 | Sullivan | 525/221 |
| 5,908,358 | A | 6/1999 | Wu | 473/378 |
| 5,919,101 | A | 7/1999 | Yokota et al. | 473/374 |
| 5,929,171 | A | 7/1999 | Sano et al. | 525/261 |
| 5,959,059 | A | 9/1999 | Vedula et al. | 528/76 |
| 5,994,472 | A | 11/1999 | Egashira et al. | 525/221 |
| 6,012,997 | A | 1/2000 | Mason | 473/594 |
| 6,057,403 | A | 5/2000 | Sullivan et al. | 525/221 |
| 6,117,024 | A | 9/2000 | Dewanjee | 473/351 |
| 6,120,392 | A | 9/2000 | Kashiwagi et al. | 473/374 |
| 6,121,357 | A | 9/2000 | Yokota | 524/406 |
| 6,126,558 | A | 10/2000 | Higuchi et al. | 473/374 |
| 6,130,295 | A | 10/2000 | Yokota | 525/221 |
| 6,135,898 | A | 10/2000 | Higuchi et al. | 473/374 |
| 6,174,247 | B1 | 1/2001 | Higuchi et al. | 473/374 |
| 6,180,040 | B1 | 1/2001 | Ladd et al. | 264/248 |
| 6,180,722 | B1 | 1/2001 | Dalton et al. | 525/193 |
| 6,184,301 | B1 | 2/2001 | Shindo et al. | 525/261 |
| 6,241,625 | B1 | 6/2001 | Yokota et al. | 473/373 |
| 6,287,218 | B1 | 9/2001 | Ohama | 473/377 |
| 6,468,169 | B1 * | 10/2002 | Hayashi et al. | 473/371 |
| 2002/0098915 | A1 * | 7/2002 | Cavallaro et al. | 473/354 |

* cited by examiner

FIGURE 1

THIN, THERMOSET, POLYURETHANE-COVERED GOLF BALL WITH A DUAL CORE

CROSS REFERENCE TO RELATED APPLICATIONS

This application is a divisional of application Ser. No. 10/051,715, filed Jan. 17, 2002, now U.S. Pat. No. 6,849,006. Application Ser. No. 10/051,715 is 1) a continuation-in-part of application Ser. No. 09/951,963, filed Sep. 13, 2001, now U.S. Pat. No. 6,635,716; as well as 2) a continuation-in-part of application Ser. No. 09/782,782, filed Feb. 13, 2001, which is a continuation-in-part of application Ser. No. 09/274,015, filed Mar. 22, 1999 now abandoned, which is a continuation-in-part of application Ser. No. 08/863,788 filed May 27, 1997 now U.S. Pat. No. 5,885,172; and 2a) a continuation-in-part of application Ser. No. 09/721,740, filed Nov. 27, 2000, now U.S. Pat. No. 6,486,261 which is a continuation-in-part of application Ser. No. 09/311,591 filed May 14, 1999 now U.S. Pat. No. 6,210,294, and of 2b) application Ser. No. 09/461,736, filed Dec. 16, 1999, now U.S. Pat. No. 6,465,578 each of which is incorporated herein in its entirety by reference.

FIELD OF THE INVENTION

This invention relates generally to golf balls, and more specifically, to multi-layer golf balls. In particular, this invention relates to a golf ball having a core including a center and an outer core layer, and a cover including an inner cover layer and an outer cover layer.

BACKGROUND

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. Solid balls have traditionally been considered longer and more durable than wound balls, but also lack a particular "feel" provided by the wound construction.

By altering ball construction and composition, manufacturers can vary a wide range of playing characteristics, such as compression, velocity, and spin, each of which can be optimized for various playing abilities. One golf ball component, in particular, that many manufacturers are continually looking to improve is the center or core. The core becomes the "engine" of the golf ball when hit with a club head. Generally, golf ball cores and/or centers are constructed with a polybutadiene-based polymer composition. Compositions of this type are constantly being altered in an effort to provide a higher coefficient of restitution ("COR") while at the same time resulting in a lower compression which, in turn, can lower the golf ball spin rate, provide better "feel," or both. This is a difficult task, however, given the physical limitations of currently-available polymers. As such, there remains a need for novel and improved golf ball core compositions.

It has been determined that, upon addition of a halogenated organosulfur compound or the salts thereof, in particular, pentachlorothiophenol ("PCTP") salt, to polybutadiene rubber compositions, that golf ball cores may be constructed that exhibit increased COR, decreased compression, or both. The present invention is, therefore, directed to golf ball centers and cores that include a halogenated organosulfur compound, or a salt thereof, for embodiments such as these.

SUMMARY OF THE INVENTION

The present invention is directed to a golf ball comprising a core and a cover disposed about the core, wherein the core comprises a center and an outer core layer, and the cover comprises an inner cover layer and an outer cover layer; and wherein the center has an outer diameter from about 0.375 inches to about 1.4 inches and deflection of greater than about 4.5 mm under a load of 100 Kg; the outer core layer has an outer diameter of from about 1.4 in to about 1.62 in; the inner cover layer has an outer diameter of greater than about 1.58 in and a material hardness of less than about 72 Shore D; and the outer cover layer has a hardness of greater than about 50 Shore D and a material hardness of less than about 50 Shore D.

Preferably, the inner cover layer material hardness is between about 60 and about 70 Shore D, and has an outer diameter is from about 1.59 in to about 1.66 inches. The center should have an outer diameter between about 0.5 inches and about 1.25 inches but in a preferred embodiment, the center has an outer diameter no greater than about 1.0 inches. The outer core layer outer has a diameter from about 1.52 inches to about 1.58 inches but in one embodiment, the outer core layer has an outer diameter of at least about 1.55 inches.

In an alternative embodiment, the center has a first hardness, the outer core layer has a second hardness greater than the first, and the inner cover layer has a third hardness greater than the second. Preferably, the outer cover layer has a fourth hardness less than the third hardness.

The center may be solid, liquid, hollow, or air-filled. At least one of the inner or outer cover layers has a thickness of less than about 0.05 inches. The inner cover layer can include an ionomeric material, vinyl resins, polyolefins, polyurethanes, polyureas, polyamides, acrylic resins, thermoplastics, polyphenylene oxide resins, thermoplastic polyesters, thermoplastic rubbers, fully-neutralized polymers, partially-neutralized polymers, and mixtures thereof.

At least one of the center, core layer, or inner and outer cover layers includes polybutadiene rubber composition comprising between about 2.2 parts and about 5 parts of a halogenated organosulfur compound. Suitable halogenated organosulfur compounds include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3- iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof.

Preferably, the halogenated organosulfur compound is pentachlorothiophenol or the metal salt thereof, the metal salt is selected from the group consisting of zinc, calcium, magnesium, sodium, and lithium. Most preferably, the metal salt is zinc.

In one embodiment, the center and the outer core layer are solid and comprise polybutadiene rubber composition comprising between about 2.2 parts and about 5 parts of a halogenated organosulfur compound or the zinc salt thereof. In a preferred embodiment, the center and the outer core layer are solid and the center comprises polybutadiene rubber composition comprising between about 2.2 parts and about 5 parts of a halogenated organosulfur compound or the zinc salt thereof. In an alternative embodiment, the center and the outer core layer are solid and the outer core layer comprises polybutadiene rubber composition comprising between about 2.2 parts and about 5 parts of a halogenated organosulfur compound or the zinc salt thereof.

The core should have an SCDI compression less than about 160. Preferably, the core has an SCDI compression between about 40 and about 160 and most preferably, the core has an SCDI-compression between about 60 and about 120.

The polybutadiene composition can further include an $\alpha,\beta$-unsaturated carboxylic acid or a metal salt thereof, an organic peroxide, and a filler. The outer cover layer may include a polyurethane composition comprising a prepolymer formed of a polyisocyanate and a polyol, and a curing agent. Preferably, at least one of the prepolymer and curing agent are saturated. In an additional embodiment, the polyurethane composition comprises at least one of a UV absorber, a hindered amine light stabilizer, or an optical brightener.

DETAILED DESCRIPTION

The golf ball cores of the present invention may comprise any of a variety of constructions, but preferably include a core formed of a center and at least one outer core layer and a cover formed of an outer cover layer and at least one inner cover layer. The core and/or the cover layers may be formed of more than one layer and an intermediate or mantle layer may be disposed between the core and the cover of the golf ball. The innermost portion of the core, while preferably solid, may be a hollow or a liquid-, gel-, or air-filled sphere. As with the core, the cover layers may also comprise a plurality of layers. The core may also comprise a solid or liquid filled center around which many yards of a tensioned elastomeric material are wound.

The materials for solid cores include compositions having a base rubber, a crosslinking agent, a filler, a halogenated organosulfur compound, and a co-crosslinking or initiator agent. The base rubber typically includes natural or synthetic rubbers. A preferred base rubber is 1,4-polybutadiene having a cis-structure of at least about 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2. Examples of desirable polybutadiene rubbers include BUNA® CB22 and BUNA® CB23, commercially available from Bayer of Akron, Ohio; UBE-POL® 360 L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

The crosslinking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The crosslinking agent is typically present in an amount greater than about 10 parts per hundred ("pph") parts of the base polymer, preferably from about 20 to 40 pph of the base polymer, more preferably from about 25 to 35 pph of the base polymer.

The initiator agent can be any known polymerization initiator which decomposes during the cure cycle. Suitable initiators include organic peroxide compounds, such as dicumyl peroxide; 1,1-di(t-butylperoxy) 3,3,5-trimethyl cyclohexane; $\alpha,\alpha$-bis (t-butylperoxy) diisopropylbenzene; 2,5-dimethyl-2,5 di(t-butylperoxy) hexane; di-t-butyl peroxide; and mixtures thereof. Other examples include, but are not limited to, VAROX® 231XL and VAROX® DCP-R, commercially available from Elf Atochem of Philadelphia, Pa.; PERKODOX ® BC and PERKODOX ® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent 4 pph of a concentrate peroxide that is 50% active (i.e., 2 divided by 0.5=4).

The halogenated organosulfur compounds of the present invention include, but are not limited to those having the following general formula:

where $R_1$–$R_5$ can be $C_1$–$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat or salt form from eChinachem of San Francisco, Calif. Most preferably, the halogenated organosulfur compound is the zinc salt of pentachlorothiophenol. The halogenated organosulfur compounds of the present invention are preferably present in an amount greater than about 2.2 pph, more preferably between about 2.3 pph and about 5 pph, and most preferably between about 2.3 and about 4 pph.

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, UV absorbers, hindered amine light stabilizers, optical brighteners, and the like. Fillers added to one or more portions of the golf ball typically include processing aids or compounds to affect Theological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls.

The invention also includes a method to convert the cis-isomer of the polybutadiene resilient polymer component to the trans-isomer during a molding cycle and to form a golf ball. A variety of methods and materials suitable for cis-to-trans conversion have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

Properties that are desirable for the cover include good moldability, high abrasion resistance, high tear strength, high resilience, and good mold release. The cover typically has a thickness to provide sufficient strength, good performance characteristics, and durability. The cover preferably has a thickness of less than about 0.1 inches, more preferably, less than about 0.05 inches, and most preferably, between about 0.02 inches and about 0.04 inches. The invention is particularly directed towards a multilayer golf ball which comprises a core, an inner cover layer, and an outer cover layer. In this embodiment, preferably, at least one of the inner and outer cover layer has a thickness of less than about 0.05 inches, more preferably between about 0.02 inches and about 0.04 inches. Most preferably, the thickness of either layer is about 0.03 inches.

When the golf ball of the present invention includes an inner cover layer, this layer can include any materials known to those of ordinary skill in the art, including thermoplastic and thermosetting material, but preferably the inner cover can include any suitable materials, such as ionic copolymers of ethylene and an unsaturated monocarboxylic acid which are available under the trademark SURLYN® of E. I. DuPont de Nemours & Co., of Wilmington, Del., or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric inner cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL® by E. I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and (11) Blends of thermoplastic rubbers with polyethylene, propylene, polyacetal, nylon, polyesters, cellulose esters, and the like.

Preferably, the inner cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. Preferably, the acrylic or methacrylic acid is present in about 8 to 35 weight percent, more preferably 8 to 25 weight percent, and most preferably 8 to 20 weight percent.

Any of the inner or outer cover layers may also be formed from polymers containing $\alpha$, $\beta$-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The acid copolymers can be described as E/X/Y copolymers where E is ethylene, X is an $\alpha$, $\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

Examples of these materials are disclosed in U.S. Patent Application Publication Nos. 2001/0018375 and 2001/0019971, which are incorporated herein in their entirety by express reference thereto.

While the outer cover may be formed of any of the above-listed materials, the outer cover preferably includes a polyurethane, polyurea, or epoxy composition, generally comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H$_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

Figure 1:
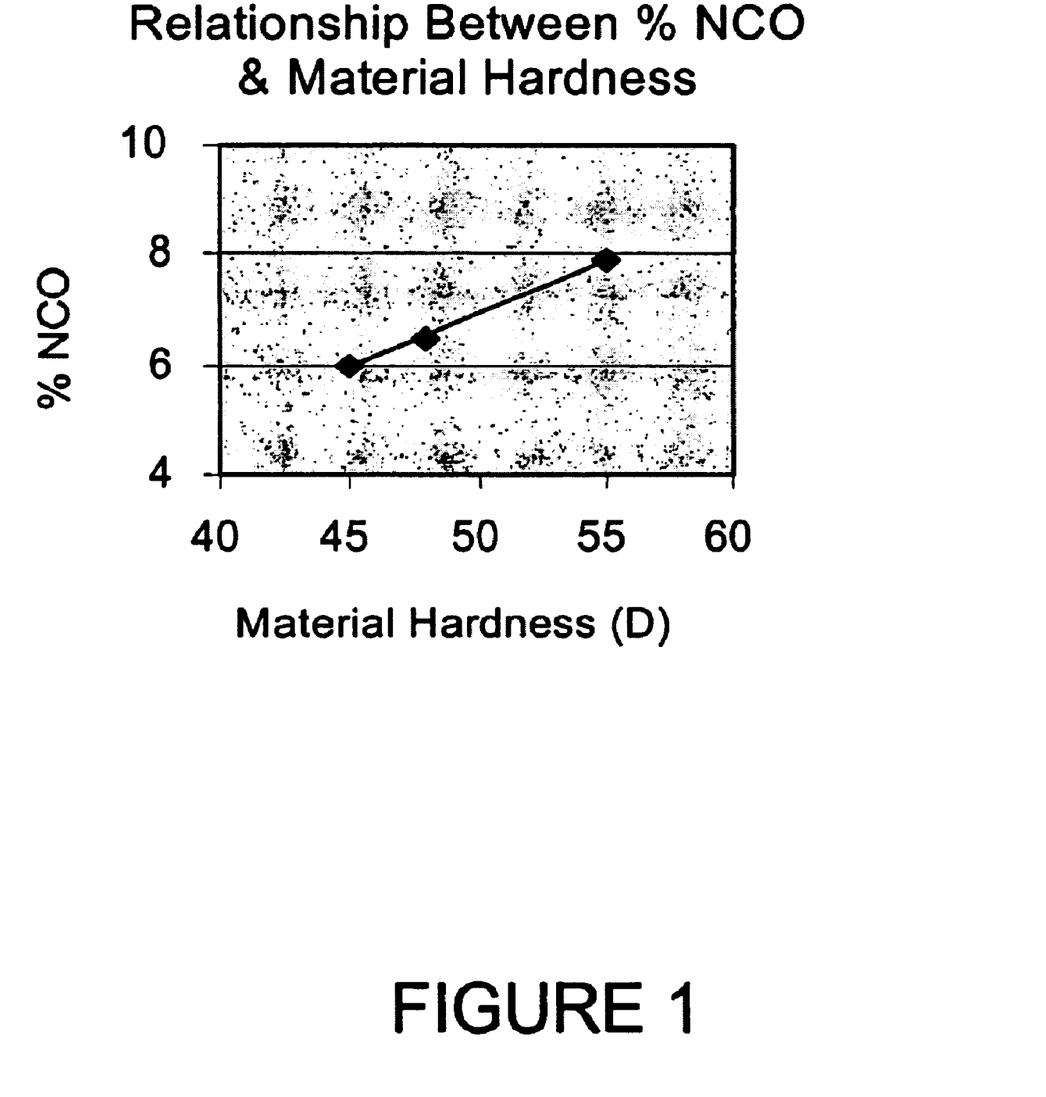
FIG. 1 is a plot of % NCO v. material hardness.

The at least one polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups (See FIG. 1) As such, if the polyisocyanate has less than about 7.0% unreacted groups, the corresponding polyurethane material will have a material hardness of less than about 50 Shore D.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof, 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline)

("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as Ethacure® 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated polyurethanes used to form cover layers, preferably the outer cover layer, and may be selected from among both castable thermoset and thermoplastic polyurethanes. In this embodiment, the saturated polyurethanes are substantially free of aromatic groups or moieties.

Saturated diisocyanates which can be used include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate and isophorone diisocyanate ("IPDI").

Saturated polyols which are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino) cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bis-propylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 to about 100%, more preferably from about 10 to about 75% of the cover composition and/or the intermediate layer composition. About 90 to about 10%, more preferably from about 90 to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance.

Thermoplastic polyurethanes may be blended with suitable materials to produce a thermoplastic end product. Examples of such additional materials may include ionomers such as the SURLYN®, ESCOR® and IOTEK® copolymers described above.

Other suitable materials which may be combined with the saturated polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 and U.S. Pat. No. 5,334,673 both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

In one embodiment of the golf ball of the present invention, the center has a first hardness, the outer core layer has a second hardness greater than the first, and the inner cover layer has a third hardness greater than the second. Additionally, it is preferred that the outer cover layer has a fourth hardness less than the third hardness.

The molding process and composition of golf ball portions typically results in a gradient of material properties.

Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball cured polybutadiene material typically has a hardness of at least about 15 Shore A, preferably between about 30 Shore A and 80 Shore D, more preferably between about 50 Shore A and 60 Shore D.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 60 Shore D, more preferably between about 25 and about 50 Shore D, and most preferably between about 45 and about 48 Shore D. The inner cover layer preferably has a material hardness of less than about 70 Shore D, more preferably between about 30 and about 70 Shore D, and most preferably, between about 50 and about 65 Shore D.

The core of the present invention has a Soft Center Deflection Index ("SCDI") compression of less than about 160, more preferably, between about 40 and about 160, and most preferably, between about 60 and about 120. In an alternative, low compression embodiment, the core has an Atti compression less than about 20, more preferably less than about 10, and most preferably, 0.

The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

The SCDI is a slight variation of this set up. The hardware is the same, but the software and output has changed. With the SCDI, we are only interested in the pounds of force required to deflect a core x amount of inches. That amount of deflection is 10% percent of the core's diameter. The DCM is triggered, the cylinder deflects the core by 10% of its diameter, and the DCM reports back the pounds of force required (as measured from the attached load cell) to deflect the core by that amount. The value displayed is a single number in units of pounds.

The overall outer diameter ("OD") of the core is less than about 1.610 inches, preferably, no greater than 1.590 inches, more preferably between about 1.540 inches and about 1.580 inches, and most preferably between about 1.50 inches to about 1.570 inches. The OD of the inner cover layer is preferably between 1.580 inches and about 1.640 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

EXAMPLE

Three solid cores, each having an outer diameter of 1.58 inches, were formed of a composition comprising polybutadiene rubber, zinc diacrylate, zinc oxide, dicumyl peroxide, barium sulfate, and color dispersion. One core, representative of conventional technology, was used as a control. The two remaining cores were each additionally blended with 5.3 parts Struktol® (Example 1) and the zinc salt of pentachlorothiophenol at 2.4 parts (Example 2). Struktol® at 5.3 parts contains 2.4 parts PCTP. The specific compositions for each of the solid cores are presented below in Table I.

TABLE I

| | CONTROL | | | EXAMPLE 1 | | | EXAMPLE 2 | | | |
|---|---|---|---|---|---|---|---|---|---|---|
| INGREDIENT | | | | | | | | | | |
| polybutadiene rubber | 100 | 100 | 100 | 100 | 100 | 100 | 100 | 100 | 100 | 100 |
| zinc diacrylate | 18 | 25 | 30 | 27 | 34 | 41 | 20 | 25 | 30 | 35 |
| dicumyl peroxide | 0.5 | 0.5 | 0.5 | 1.8 | 1.8 | 1.8 | 0.8 | 0.8 | 0.8 | 0.8 |
| Struktol ® A95 | — | — | — | 5.3 | 5.3 | 5.3 | — | — | — | — |
| zinc salt of PCTP | — | — | — | — | — | — | 2.4 | 2.4 | 2.4 | 2.4 |
| zinc oxide | 26.5 | 24.1 | 22.2 | 5 | 5 | 5 | 5 | 5 | 5 | 5 |

TABLE I-continued

|  | CONTROL | | | EXAMPLE 1 | | | EXAMPLE 2 | | | |
| --- | --- | --- | --- | --- | --- | --- | --- | --- | --- | --- |
| barium sulfate | — | — | — | 16.2 | 13.4 | 10.6 | 21.7 | 19.7 | 17.7 | 15.7 |
| color dispersion | 0.14 | 0.14 | 0.14 | 0.14 | 0.14 | 0.14 | 0.14 | 0.14 | 0.14 | 0.14 |
| PROPERTY | | | | | | | | | | |
| Effective Modulus (psi) | 3800 | 6200 | 8700 | 4100 | 6200 | 7700 | 3600 | 5100 | 7400 | 9700 |
| Atti Compression | 17 | 52 | 76 | 22 | 52 | 67 | 13 | 38 | 65 | 84 |
| COR @ 125 ft/s | 0.764 | 0.789 | 0.802 | 0.773 | 0.7941 | 0.802 | 0.782 | 0.801 | 0.813 | 0.823 |

It is very apparent that the addition of PCTP, in either form, increases COR, decreases compression, or both. In particular, the PCTP zinc salt (Example 2) provides comparable COR's with lower compression and/or increased COR's with comparable (or lower) compression, both of which are desirable golf ball properties.

The halogenated organosulfur polymers of the present invention may also be used in golf equipment, in particular, inserts for golf clubs, such as putters, irons, and woods, and in golf shoes and components thereof.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
    a core comprising a center having an outer diameter from about 0.375 inches to about 1.4 inches and deflection of greater than about 4.5 mm under a load of 100 kg and an outer core layer having an outer diameter of from about 1.4 inches to about 1.62 inches, wherein the center and core layer are formed from a polybutadiene rubber composition comprising a halogenated organosulfur compound or a metal salt thereof, and
    a cover comprising an inner cover layer having an outer diameter of greater than about 1.58 inches and a material hardness of less than about 72 Shore D and an outer cover layer having a hardness of greater than about 50 Shore D and a material hardness of less than about 50 Shore D;
    wherein the outer cover layer comprises a polyurea composition.

2. The golf ball of claim 1, wherein the inner cover layer has a material hardness of between about 60 and about 70 Shore D and an outer diameter of about 1.59 in to about 1.66 inches.

3. The golf ball of claim 1, wherein the center has an outer diameter between about 0.5 inches and about 1.25 inches.

4. The golf ball of claim 1, wherein the outer core layer outer diameter is from about 1.52 inches to about 1.58 inches.

5. The golf ball of claim 1, wherein the center has a first hardness, the outer core layer has a second hardness greater than the first, the inner cover layer has a third hardness greater than the second, and the outer cover layer has a fourth hardness less than the third hardness.

6. The golf ball of claim 1, wherein at least one of the inner or outer cover layers have a thickness of less than about 0.05 inches.

7. The golf ball of claim 1, wherein the halogenated organosulfur compound is selected from the group consisting of pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; metal salts thereof, and mixtures thereof.

8. The golf ball of claim 7, wherein the halogenated organosulfur compound is pentachlorothiophenol or the metal salt thereof, wherein the metal salt is selected from the group consisting of zinc, calcium, magnesium, sodium, and lithium.

9. A golf ball comprising:
    a core comprising a solid center having an outer diameter from about 0.375 inches to about 1.4 inches and deflection of greater than about 4.5 mm under a load of 100 kg and an outer core layer having an outer diameter of from about 1.4 inches to about 1.62 inches, and
    a cover comprising an inner cover layer having an outer diameter of greater than about 1.58 inches and a material hardness of less than about 72 Shore D and an outer cover layer comprising polyurea and having a hardness of greater than about 50 Shore D and a material hardness of less than about 50 Shore D
    wherein the center and core layer comprise polybutadiene rubber composition comprising a halogenated organosulfur compound or a metal salt thereof.

10. The golf ball of claim 9, wherein the inner cover layer has a material hardness of between about 60 and about 70 Shore D and an outer diameter of about 1.59 inches to about 1.66 inches.

11. The golf ball of claim 9, wherein the center has an outer diameter between about 0.5 inches and about 1.25 inches.

12. The golf ball of claim 9, wherein the outer core layer outer diameter is from about 1.52 inches to about 1.58 inches.

13. The golf ball of claim 9, wherein the center has a first hardness, the outer core layer has a second hardness greater than the first, the inner cover layer has a third hardness greater than the second, and the outer cover layer has a fourth hardness less than the third hardness.

14. The golf ball of claim 9, wherein at least one of the inner or outer cover layers have a thickness of less than about 0.05 inches.

15. The golf ball of claim 9, wherein the inner cover layer comprises ionomers, vinyl resins, polyolefins, polyurethanes, polyureas, polyamides, acrylic resins, thermoplastics, polyphenylene oxide resins, thermoplastic polyesters, thermoplastic rubbers, fully-neutralized polymers, partially-neutralized polymers, or mixtures thereof.

16. The golf ball of claim 9, wherein the polyurea composition is light stable.

17. The golf ball of claim 9, wherein the halogenated organosulfur compound is selected from the group consisting of pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; metal salts thereof, and mixtures thereof.

18. The golf ball of claim 17, wherein the halogenated organosulfur compound is pentachlorothiophenol or the metal salt thereof, wherein the metal salt is selected from the group consisting of zinc, calcium, magnesium, sodium, and lithium.

19. A golf ball comprising:

a core comprising a solid center having an outer diameter from about 0.375 inches to about 1.4 inches and deflection of greater than about 4.5 mm under a load of 100 kg and an outer core layer having an outer diameter of from about 1.4 inches to about 1.62 inches, wherein the center and core layer comprise a polybutadiene rubber composition comprising pentachlorothiophenol or the metal salt thereof, and wherein the metal salt is selected from the group consisting of zinc, calcium, magnesium, sodium, and lithium, and a cover comprising an inner cover layer having an outer diameter of greater than about 1.58 inches and a material hardness of less than about 72 Shore D and an outer cover layer comprising polyurea and having a hardness of greater than about 50 Shore D and a material hardness of less than about 50 Shore D, at least one of the inner or outer cover layers having a thickness of less than about 0.05 inches.

20. A golf ball comprising:

a core comprising a solid center having a first hardness, an outer diameter from about 0.375 inches to about 1.4 inches, and a deflection of greater than about 4.5 mm under a load of 100 kg, and an outer core layer having a second hardness and an outer diameter of from about 1.4 inches to about 1.62 inches, wherein the center and core layer comprise a polybutadiene rubber composition comprising pentachlorothiophenol or the metal salt thereof, and wherein the metal salt is selected from the group consisting of zinc, calcium, magnesium, sodium, and lithium; and a cover comprising an inner cover layer having a third hardness, an outer diameter of greater than about 1.58 inches, and a material hardness of less than about 72 Shore D, and an outer cover layer comprising polyurea and having a fourth hardness of less than about 50 Shore D, at least one of the inner or outer cover layers having a thickness of less than about 0.05 inches;

wherein the second hardness is greater than the first, the third hardness is greater than the second hardness, and the fourth hardness is less than the third hardness.

* * * * *